(12) United States Patent
Chapman et al.

(10) Patent No.: US 11,541,635 B2
(45) Date of Patent: Jan. 3, 2023

(54) FLEXIBLE CARBON FIBER DECORATIVE VENEER

(71) Applicant: Goodrich Corporation, Charlotte, ND (US)

(72) Inventors: Christopher L. Chapman, Georgetown, IN (US); Brian K. Barnett, New Albany, IN (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 17/236,885

(22) Filed: Apr. 21, 2021

(65) Prior Publication Data
US 2021/0237401 A1 Aug. 5, 2021

Related U.S. Application Data

(63) Continuation-in-part of application No. 16/389,244, filed on Apr. 19, 2019, now Pat. No. 11,426,983.

(51) Int. Cl.
*B32B 9/00* (2006.01)
*B32B 5/02* (2006.01)
(Continued)

(52) U.S. Cl.
CPC ............ *B32B 9/007* (2013.01); *B32B 3/12* (2013.01); *B32B 5/024* (2013.01); *B32B 5/262* (2021.05);
(Continued)

(58) Field of Classification Search
CPC ........ B32B 3/12; B32B 5/024; B32B 5/262; B32B 7/12; B32B 9/007;
(Continued)

(56) References Cited

U.S. PATENT DOCUMENTS 9,162,420 B2 10/2015 Müller et al.
2003/0092340 A1 5/2003 Li et al.
(Continued)

FOREIGN PATENT DOCUMENTS

CA 2936290 A1 1/2017
CN 108481492 A 9/2018
(Continued)

OTHER PUBLICATIONS

Translation of WO2010/057478 (claims and description). (Year: 2010).*

(Continued)

*Primary Examiner* — Catherine A. Simone
(74) *Attorney, Agent, or Firm* — Suiter Swantz pc llo

(57) ABSTRACT

A flexible carbon fiber decorative veneer may include a veneer panel assembly with a face layer formed from a carbon fiber material, a backing layer formed from a flexible fleece, and an adhesive configured to attach the face layer to the backing layer through activation via at least one joining process. The backing layer may be configured to prevent light from passing through voids or interstitial spaces in the carbon fiber material of the face layer when the backing layer is attached to the face layer via the adhesive. The flexible carbon fiber decorative veneer may be configured for use on an aircraft interior structure, the base structure for which being fabricated from an aviation honeycomb layer and a back panel. The veneer panel assembly may be configured to conform to a radius of at least 0.25 inches on the aircraft interior structure.

11 Claims, 8 Drawing Sheets

(51) Int. Cl.
*B32B 5/26* (2006.01)
*B32B 7/12* (2006.01)
*B32B 3/12* (2006.01)

(52) U.S. Cl.
CPC ........ *B32B 7/12* (2013.01); *B32B 2307/3065* (2013.01); *B32B 2451/00* (2013.01); *B32B 2605/003* (2013.01); *B32B 2605/18* (2013.01)

(58) Field of Classification Search
CPC ........ B32B 2307/3065; B32B 2451/00; B32B 2605/003; B32B 2605/18
See application file for complete search history.

(56) References Cited

U.S. PATENT DOCUMENTS

| | | |
|---|---|---|
| 2004/0028958 A1 | 2/2004 | Assink et al. |
| 2004/0219855 A1 | 11/2004 | Tsotsis |
| 2008/0093013 A1 | 4/2008 | Muller |
| 2016/0114556 A1 | 4/2016 | Lay et al. |
| 2017/0015081 A1 | 1/2017 | Massarelli et al. |
| 2017/0106620 A1 | 4/2017 | Smith et al. |
| 2018/0022967 A1 | 1/2018 | Pyun et al. |
| 2018/0162086 A1 | 6/2018 | Teutsch |
| 2018/0370185 A1 | 12/2018 | Darlington |
| 2020/0331239 A1 | 10/2020 | Chapman et al. |

FOREIGN PATENT DOCUMENTS

| | | | |
|---|---|---|---|
| DE | 102007024052 A1 | 12/2008 | |
| DE | 202016102228 U1 | 5/2017 | |
| DE | 102016107789 A1 | 11/2017 | |
| EP | 2522503 A2 | 11/2012 | |
| EP | 3003705 A1 | 4/2016 | |
| EP | 3725514 A1 | 10/2020 | |
| WO | WO-2010057478 A2 * | 5/2010 | ............ B32B 27/20 |
| WO | 2010057478 A3 | 8/2010 | |
| WO | 2013124760 A1 | 8/2013 | |

OTHER PUBLICATIONS

European Search Report dated Jun. 3, 2020 for Application No. 19213857.6.
Extended Search Report in European Application No. 22168191.9 dated Sep. 8, 2022, 5 pages.

* cited by examiner

FLEXIBLE CARBON FIBER DECORATIVE VENEER

CROSS-REFERENCE TO RELATED APPLICATIONS

The present application is related to and claims the benefit of the earliest available effective filing date from the following applications: the present application is a continuation-in-part application of U.S. application Ser. No. 16/389,244, filed Apr. 19, 2019, which is incorporated herein by reference in the entirety.

BACKGROUND

Decorative veneer may be applied to aircraft cabin interior structures or components in aviation environments. The aircraft cabin interior structures or components may include flat surfaces and curved surfaces. The decorative veneer backer may need to conform to the curved surfaces. Modifying the decorative veneer to conform to the curved surfaces, however, may cause voids or interstitial spaces to form which allow light and/or adhesive to pass through the surface of the decorative veneer. In addition, the decorative veneer may need to meet aviation guidelines and/or standards defined for aircraft cabin interior structures or components installed in the aviation environments.

SUMMARY

A flexible carbon fiber decorative veneer is disclosed, in accordance with one or more embodiments of the disclosure. The flexible carbon fiber decorative veneer may include a veneer panel assembly. The veneer panel assembly may include a face layer formed from a carbon fiber material. The veneer panel assembly may include a backing layer formed from a flexible fleece. The veneer panel assembly may include an adhesive positioned between the face layer and the backing layer. The adhesive may be configured to attach the face layer to the backing layer through an activation via at least one joining process. The backing layer may be configured to prevent light from passing through voids or interstitial spaces in the carbon fiber material of the face layer when the backing layer is attached to the face layer via the adhesive. The flexible carbon fiber decorative veneer may be configured for use on an aircraft interior structure. The veneer panel assembly may be configured to conform to a radius of at least 0.25 inches on the aircraft interior structure.

In some embodiments, the carbon fiber material forming the face layer may be sanded from a first thickness to a second, lesser thickness prior to the face layer being attached to the backing layer via the adhesive.

In some embodiments, the flexible fleece may be a woven cellulose material.

In some embodiments, the adhesive may be pre-applied to the woven cellulose material of the flexible fleece of the backing layer.

In some embodiments, the adhesive may be a thermoset dry film adhesive. The at least one joining process may include at least one bonding process utilizing one or more of a select pressure or a select temperature.

In some embodiments, the flexible carbon fiber decorative veneer may include an aviation honeycomb layer of the flexible carbon fiber decorative veneer. The veneer panel assembly may be configured to be coupled to the aviation honeycomb layer. The flexible carbon fiber decorative veneer may include a back panel of the flexible carbon fiber decorative veneer. The aviation honeycomb layer may be configured to be coupled to the back panel. The aviation honeycomb layer and the back panel may form a base structure of the aircraft interior structure. The aviation honeycomb layer and the back panel may be fabricated with a radius of at least 0.25 inches.

In some embodiments, at least one of the veneer panel assembly, the aviation honeycomb layer, or the back panel may be configured to pass flame requirements tests as set forth in 14 C.F.R. § 25.853 and corresponding Appendix F.

A method is disclosed, in accordance with one or more embodiments of the present disclosure. The method may include, but is not limited to, forming a face layer of a veneer panel assembly of a flexible carbon fiber decorative veneer from a carbon fiber material. The method may include, but is not limited to, forming a backing layer of the veneer panel assembly of the flexible carbon fiber decorative veneer from a flexible fleece. The method may include, but is not limited to, forming the veneer panel assembly of the flexible carbon fiber decorative veneer by attaching the face layer to the backing layer via at least one joining process with an adhesive positioned between the face layer and the backing layer. The backing layer may be configured to prevent light from passing through voids or interstitial spaces in the carbon fiber material of the face layer when the backing layer is attached to the face layer via the adhesive. The flexible carbon fiber decorative veneer may be configured for use on an aircraft interior structure. The veneer panel assembly may be configured to conform to a radius of at least 0.25 inches on the aircraft interior structure.

In some embodiments, the method may include, but is not limited to, sanding the carbon fiber material of the face layer from a first thickness to a second, lesser thickness prior to the face layer being attached to the backing layer via the adhesive.

In some embodiments, the method may include, but is not limited to, coupling the veneer panel assembly to an aviation honeycomb layer of the flexible carbon fiber decorative veneer. The method may include, but is not limited to, coupling the aviation honeycomb layer to a back panel of the flexible carbon fiber decorative veneer. The aviation honeycomb layer and the back panel may form a base structure of the aircraft interior structure. The aviation honeycomb layer and the back panel may be fabricated with the radius of at least 0.25 inches.

In some embodiments, the method may include, but is not limited to, coupling the veneer panel assembly to the aviation honeycomb layer by attaching the veneer panel assembly to the aviation honeycomb layer via at least one joining process with an adhesive positioned between the veneer panel assembly to the aviation honeycomb layer.

In some embodiments, the method may include, but is not limited to, coupling the aviation honeycomb layer to the back panel by attaching the aviation honeycomb layer to the back panel via at least one joining process with an adhesive positioned between the aviation honeycomb layer to the back panel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
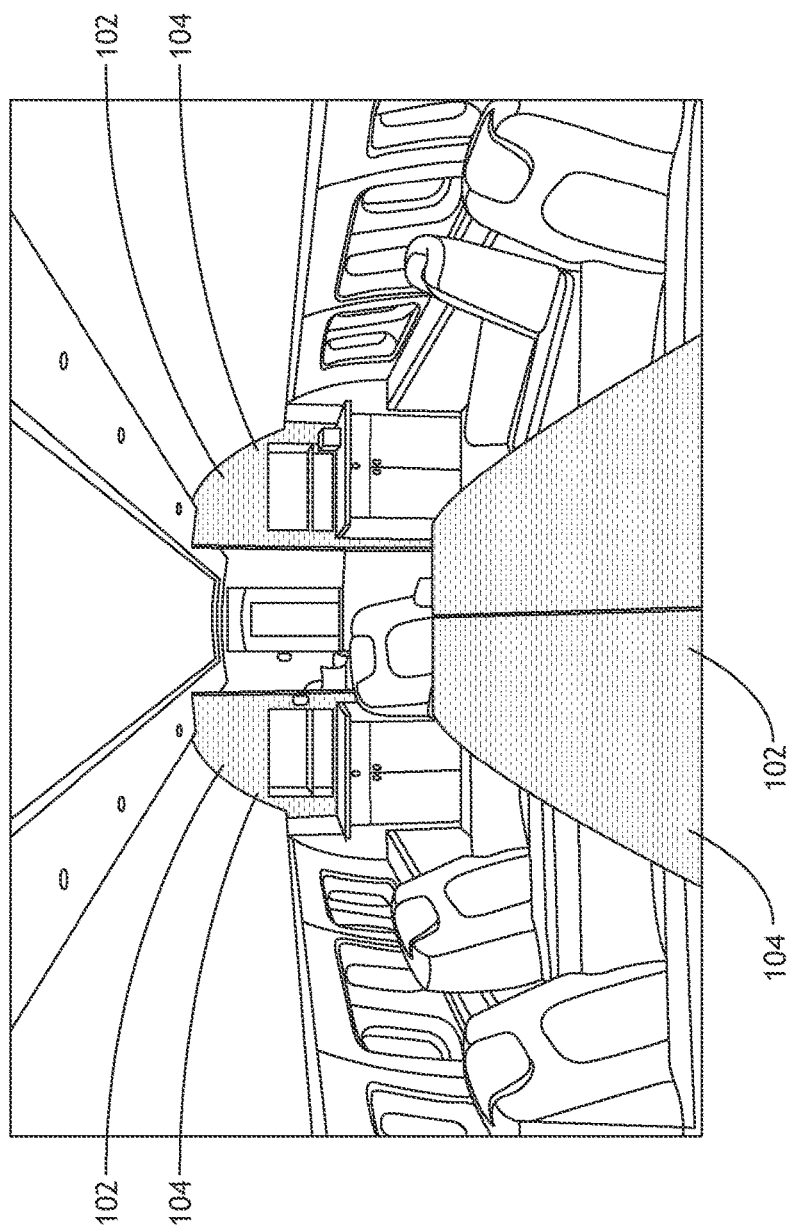
FIG. 1 illustrates an aircraft including aircraft cabin interior structures or components with a flexible carbon fiber decorative veneer, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-4B generally illustrate a flexible carbon fiber decorative veneer, in accordance with one or more embodiments of the disclosure.

Decorative veneer may be applied to aircraft cabin interior structures or components in aviation environments. For example, the decorative veneer may include a carbon fiber layer that is visible when the decorative veneer is applied to the aircraft cabin interior structures or components.

The aircraft cabin interior structures or components may include flat surfaces and curved surfaces. The decorative veneer backer may need to conform to the curved surfaces. Modifying the decorative veneer to conform to the curved surfaces, however, may cause voids or interstitial spaces to form which allow light and/or adhesive to pass through the surface of the decorative veneer. For example, where the decorative veneer is fabricated from a carbon fiber material, sanding the carbon fiber material may allow for natural voids or interstitial spaces in the carbon fiber weave to increase in size (or at least become apparent). For instance, the natural voids or interstitial spaces may let adhesive used to bond the carbon fiber material to the aircraft cabin interior structures or components to soak through the carbon fiber material. For example, where the adhesive is a noticeable color (e.g., orange, or the like), the color may be visible through the carbon fiber material, reducing the aesthetic appeal of the decorative veneer.

As such, it would be desirable to create a decorative veneer that addresses the shortcomings provided above.

Embodiments of the present disclosure are directed to a flexible carbon fiber decorative veneer with a desired level of aesthetic quality, flexibility, and fire retardancy to be used on sections of one or more aircraft cabin interior structures or components having various radii, instead of or in addition to rigid carbon fiber decorative veneer. Embodiments of the present disclosure are also directed to methods of fabricating a flexible carbon fiber decorative veneer with the desired level of aesthetic quality, flexibility, and fire retardancy.

The decorative veneer may need to meet aviation guidelines and/or standards defined for aircraft cabin interior structures or components installed in aviation environments. The decorative veneer may be required to meet aviation guidelines and/or standards, by being configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards-setting organization or company; the Radio Technical Commission for Aeronautics (RTCA) or any other guidelines agency or organization; or the like. For example, the decorative veneer may be rated to pass burn requirement tests for aircraft cabin interior installations (e.g., structures or components) such as decorative veneer as set forth by the aviation guidelines and/or standards under 14 C.F.R. Part 25 and its Appendixes (e.g., 14 C.F.R. § 25.853, also found in FAA Advisory Circular (AC) 25.853-1, as entered with Amendment 25-83 on Feb. 2, 1995 and amended by Amendment 25-116 on Oct. 27, 2004). For instance, components of the decorative veneer (and thus the decorative veneer as a whole) may be capable of satisfying or exceeding the requirements set forth in the FAR 25.853 burn requirements tests including, but not limited to, the 14 C.F.R. § 25.853 Part II(a)(3) Oil Burner Test, the 14 C.F.R. § 25.853, Appendix F, Part I(b)(4) 12-Second Vertical Test, and/or the 14 C.F.R. § 25.853, Appendix F, Part I(b)(4) 60-Second Vertical Test.

In one non-limiting example, components of the decorative veneer (and thus the decorative veneer as a whole) may be capable of satisfying or exceeding the requirements set forth in the FAR 25.853 burn requirements tests which require the decorative veneer be fabricated from materials that are self-extinguishing when tested vertically (e.g., exposed to a flame while located in a vertical orientation), where the average burn length is not to exceed 6 inches, the average flame time after removal of the flame source is not to exceed 15 seconds, and drippings from the test specimen are not to continue to flame for more than an average of 3 seconds after falling. It is noted herein FAR 25.853 may include additional tests with requirements the components of the decorative veneer (and thus the decorative veneer as a whole) may be capable of satisfying or exceeding.

FIG. 1 illustrates an aircraft 100, in accordance with one or more embodiments of the present disclosure.

The aircraft 100 may include one or more aircraft cabin interior structures or components 102. For example, the one or more aircraft cabin interior structures or components 102 may include, but are not limited to, veneer decorative panels; veneer tables or work surfaces; veneer panels for suite dividers, bulkheads, or galleys; cabinets or cabinet doors; or the like. At least some of the one or more aircraft cabin interior structures or components 102 may be covered at least in part with a decorative veneer 104.

FIGS. 2A-3C in general illustrate the decorative veneer 104, in accordance with one or more embodiments of the present disclosure.

Figure 2A:
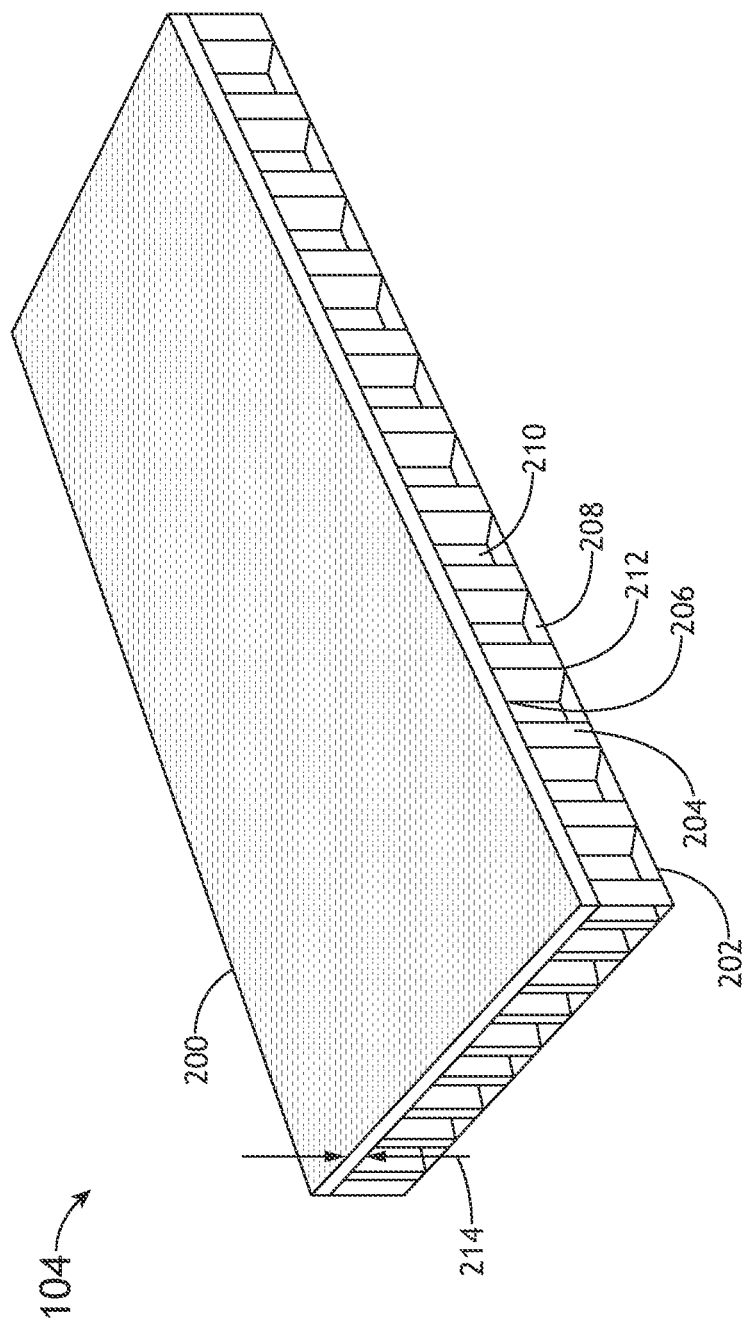
FIG. 2A illustrates a flexible carbon fiber decorative veneer, in accordance with one or more embodiments of the present disclosure.
Figure 2B:
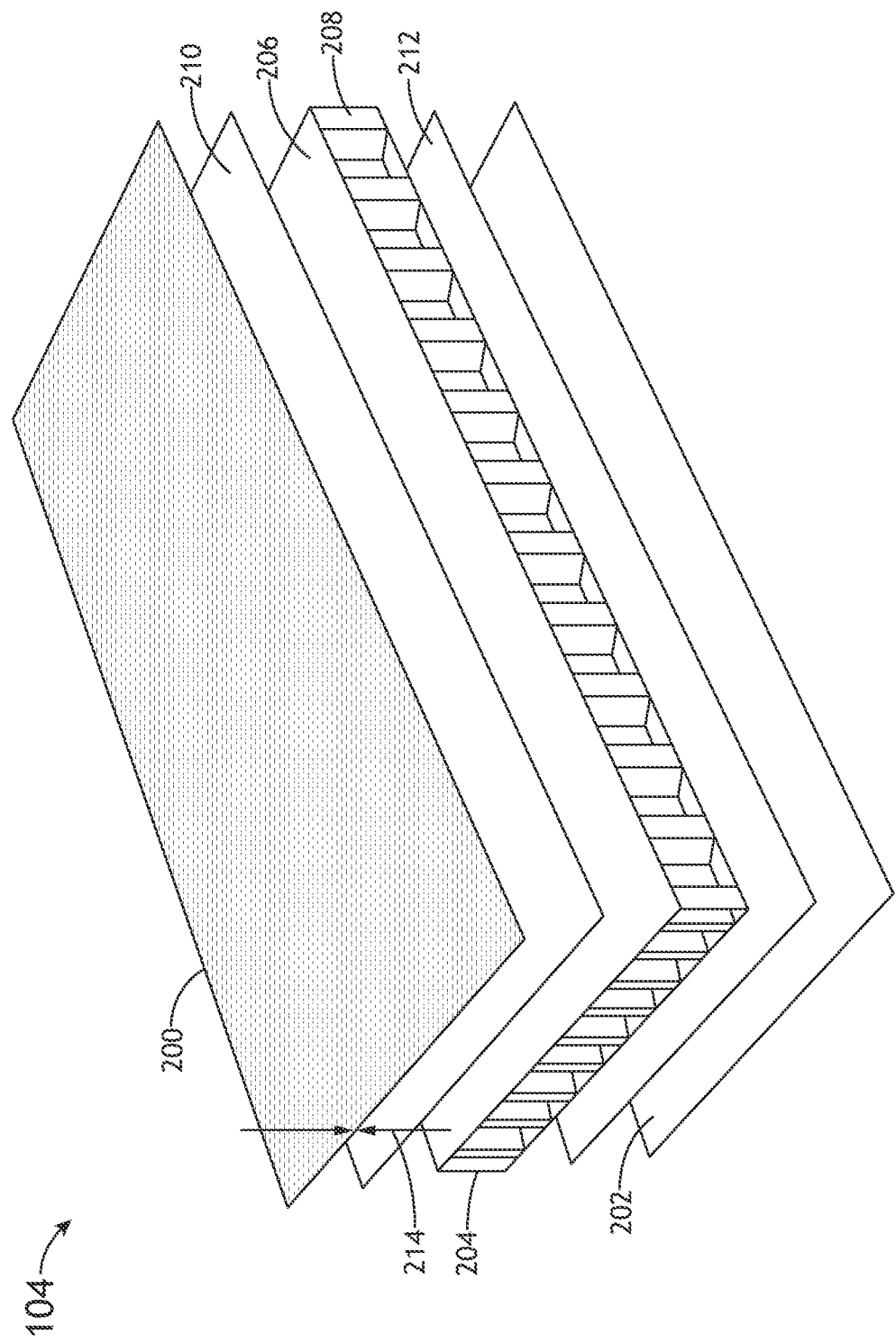
FIG. 2B illustrates a flexible carbon fiber decorative veneer, in accordance with one or more embodiments of the present disclosure.

Referring now to FIGS. 2A and 2B, the decorative veneer 104 may include a veneer panel assembly 200, a back panel 202, and an aviation honeycomb layer 204 located between the decorative veneer 104 and the back panel 202. The veneer panel assembly 200 and the back panel 202 may be joined to the aviation honeycomb layer 204 using an adhesive, chemical bonding, one or more fasteners, or the like. For example, the aviation honeycomb layer 204 may have a first surface 206 and a second surface 208. For instance, the veneer panel assembly 200 may be coupled or attached to the first surface 206 via an adhesive 210, and the back panel 202 may be coupled or attached to the second surface 208 via an adhesive 212. It is noted herein that the use of the aviation honeycomb layer 204 may result in a relatively sturdy decorative veneer 104 having a relatively low density. In particular, may be desirable to reduce a mass of aircraft components (e.g., through the use of high-density materials) as greater mass of the aircraft increases fuel consumption.

Figure 3A:
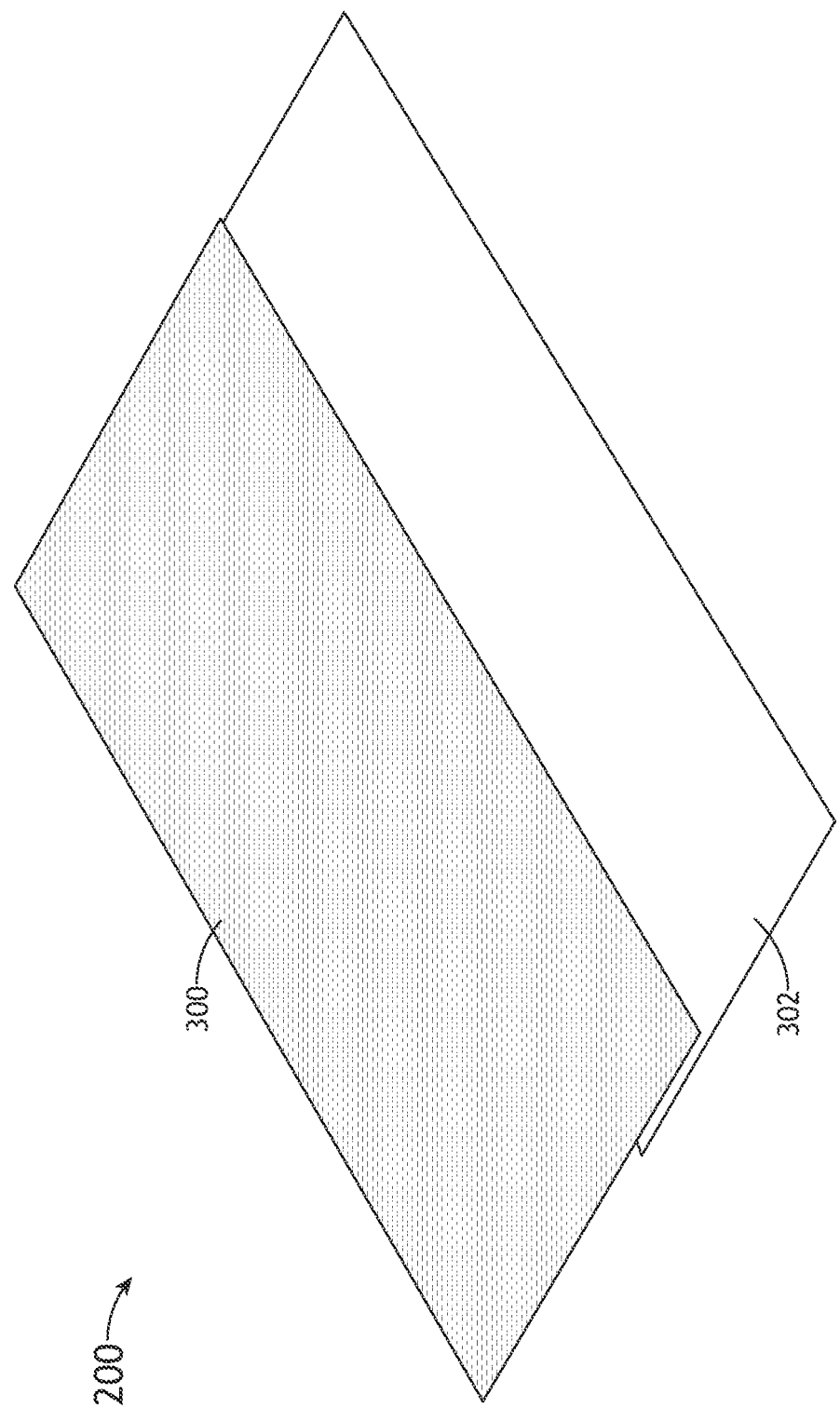
FIG. 3A illustrates a veneer panel assembly of a flexible carbon fiber decorative veneer, in accordance with one or more embodiments of the present disclosure.
Figure 3B:
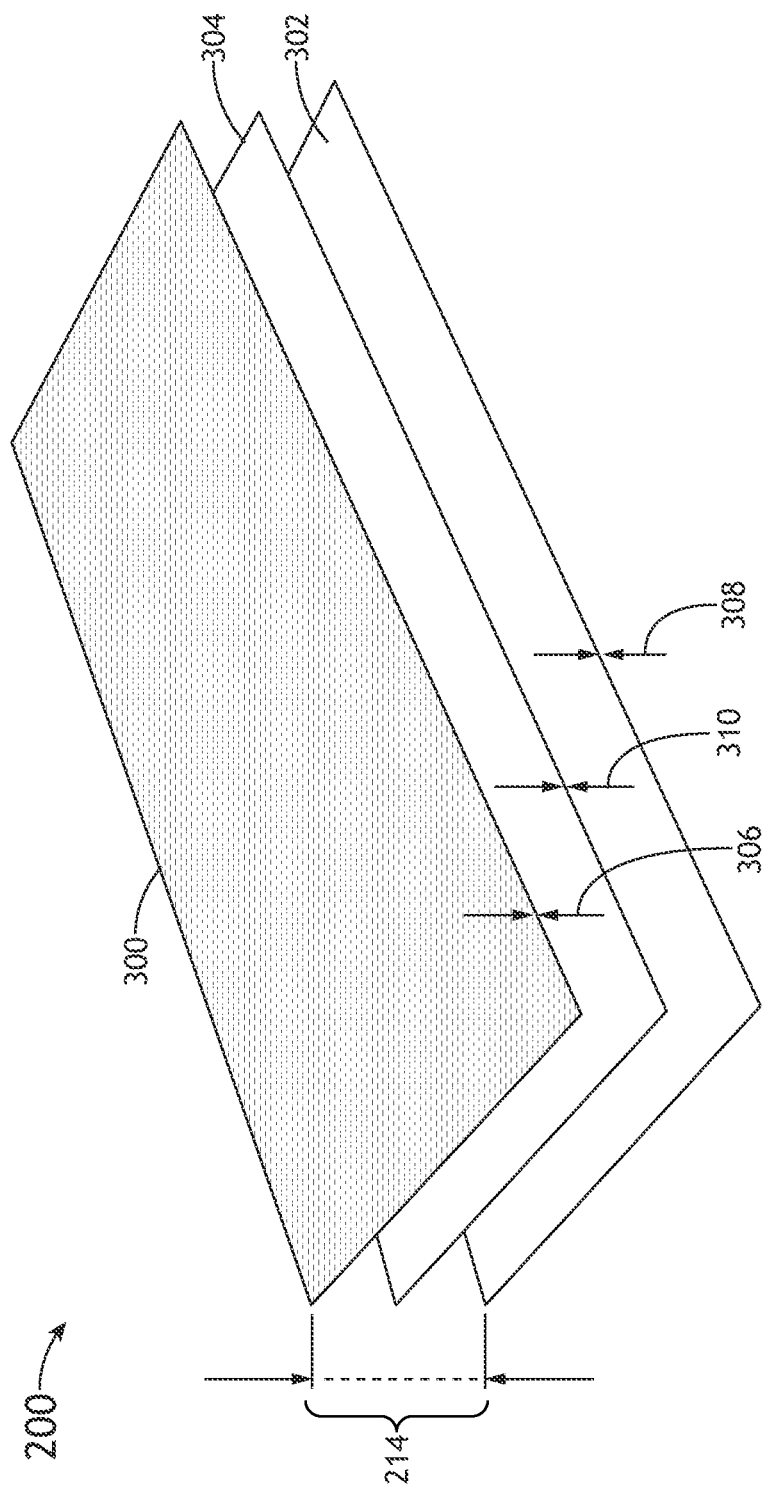
FIG. 3B illustrates a veneer panel assembly of a flexible carbon fiber decorative veneer, in accordance with one or more embodiments of the present disclosure.
Figure 3C:
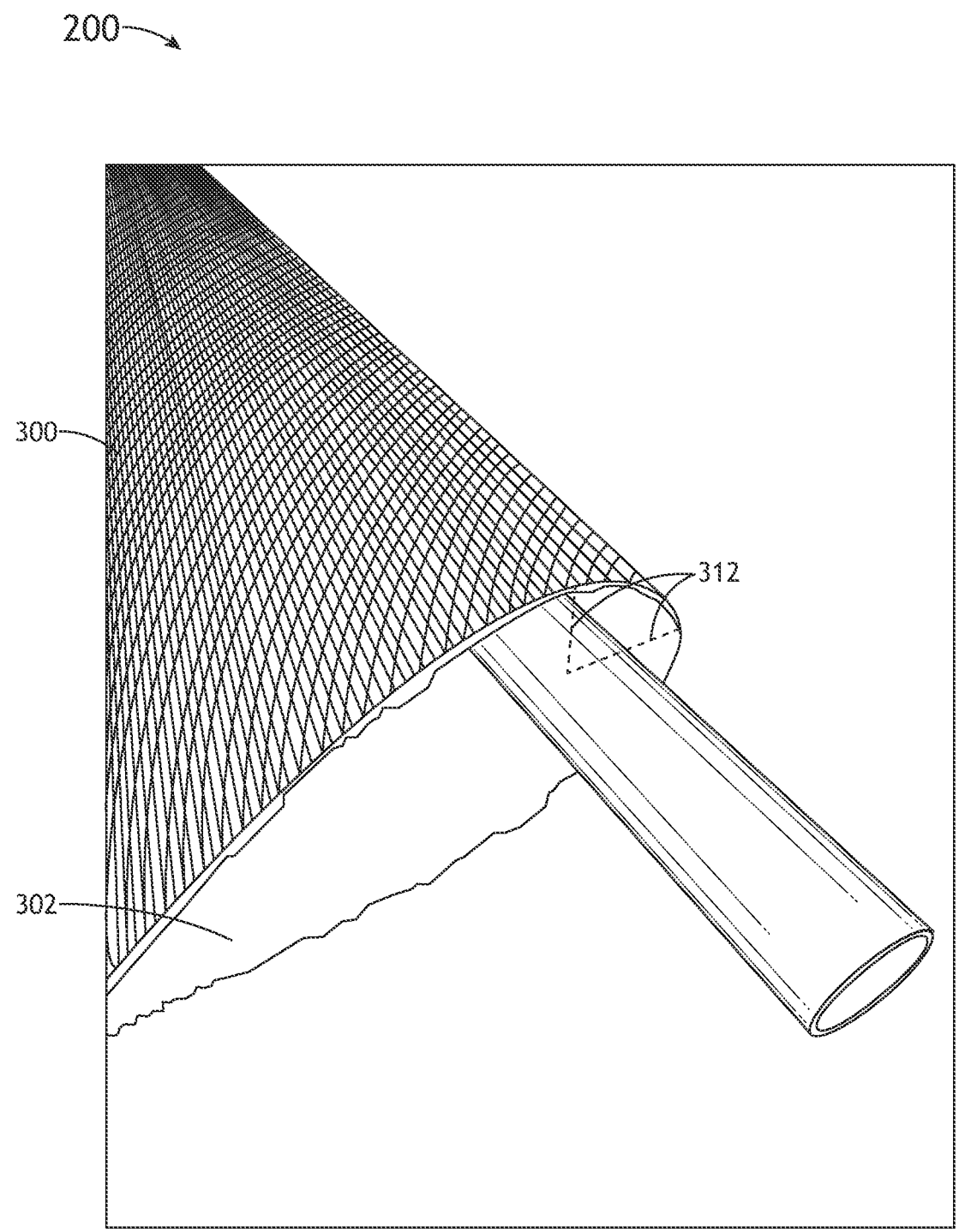
FIG. 3C illustrates a veneer panel assembly of a flexible carbon fiber decorative veneer, in accordance with one or more embodiments of the present disclosure.

Referring now to FIGS. 3A-3C, the veneer panel assembly 200 is illustrated, in accordance with one or more embodiments of the present disclosure.

The veneer panel assembly 200 may include a face layer 300 and a backing layer 302. The face layer 300 may be coupled or attached to the backing layer 302 via at least one joining process using an adhesive 304, chemical bonding, one or more fasteners, or the like.

The face layer 300 may be fabricated from a carbon fiber material. Carbon fiber has a relatively high tensile strength and impressive aesthetic appeal. However, it is relatively difficult to bond materials, such as metal or wood, to carbon fiber materials. While carbon fiber materials may be directly coupled to the aviation honeycomb layer 204 (e.g., via use of fasteners, or the like) the resultant panel assembly has drawbacks. For example, a thickness 214 of an entire decorative veneer 104 using a carbon fiber material as a face layer 300 of the veneer panel assembly 200 may be less than a corresponding decorative veneer 104 without a carbon fiber material. In this regard, features or hardware of the one or more aircraft cabin interior structures or components 102 (e.g., such as handles or knobs) may need to be redesigned to accommodate the different thickness.

The carbon fiber material of the face layer 300 may be provided in liquid form, or in a sheet form which may be cut to the desired shape of the veneer panel assembly 200. The carbon fiber material may have desirable aesthetic properties such as a relatively deep luster and a relatively glossy mirror finish. For example, the carbon fiber material may include woven carbon fiber without any additives (such as a twill weave or a plain weave).

The carbon fiber material may include woven carbon fiber with fire retardant (or other) additives or fillers (such as a plastic, resin, or the like). For instance, the carbon fiber material of the face layer 300 may include a fire-retardant material in the epoxy bonding the carbon fiber together, where the fire-retardant epoxy is designed to resist the spread of fire and assist the veneer panel assembly 200 (and thus the decorative veneer 104) in satisfying or exceeding the requirements set forth in the FAR 25.853 burn requirements tests, as defined above. In various embodiments, the carbon fiber material may be treated by the carbon fiber material manufacturer prior to the assembly of the veneer panel assembly 200, may be left untreated by the carbon fiber material manufacturer and treated during assembly of the veneer panel assembly 200, or may be left untreated by the carbon fiber material manufacturer and treated during assembly of the decorative veneer 104.

It is noted herein, however, the carbon fiber material may be an untreated carbon fiber material, meaning that the carbon fiber material lacks chemical or other treatment via conventional methods such as water-based fire retardant (e.g., in an instance where the lack of treatment does not adversely affect the veneer panel assembly 200 (and thus the decorative veneer 104) satisfying or exceeding the requirements set forth in the FAR 25.853 burn requirements tests, as defined above).

The backing layer 302 may be bonded to the carbon fiber material via the adhesive 304. For example, the adhesive 304 may be a thermoset adhesive pre-applied to the backing layer 302 by manufacturers of the backing layer 302 prior to the fabrication of the veneer panel assembly 200. By way of another example, the adhesive 304 may be applied to the backing layer 302 during fabrication of the veneer panel assembly 200. The adhesive 304 may include specific properties that facilitate chemical bonding to the backing layer 302 and the face layer 300. In particular, the adhesive 304 may be a thermoset dry film adhesive, and may be a flame retardant, B-staged modified acrylic adhesive. In various embodiments, the adhesive 304 may include a thermosetting adhesive (such as a phenolic surface film), a phenolic resin system, a phenolic impregnated kraft paper, or the like. These specific properties may allow the adhesive 304 to bond with the face layer 300 and the backing layer 302. The adhesive 304 may be formed or obtained in sheet form and may be cut to a desired shape of the veneer panel assembly 200.

The backing layer 302 may be treated with a fire retardant prior to being bonded to the face layer 300 with the adhesive 304. For example, the fire retardant may include a water-based fire retardant, and the backing layer 302 may be submerged into a bath of the fire retardant in order to provide fire resistant properties to the backing layer 302. It is noted herein using a water-based fire retardant may allow the fire retardant to be absorbed by the material of the backing layer 302. In addition, it is noted herein a non-water-based fire retardant may be used in addition to or instead of a water-based fire retardant. Further, it is noted herein the backing layer 302 may not be treated with a fire retardant (e.g., in an instance where the lack of treatment does not adversely affect the veneer panel assembly 200 (and thus the decorative veneer 104) satisfying or exceeding the requirements set forth in the FAR 25.853 burn requirements tests, as defined above).

To facilitate use of the veneer panel assembly 200 in conventional aerospace environments, the veneer panel assembly 200 may have a thickness 214 that is similar to a thickness of conventional veneer panels. The relatively constant thickness 214 of the veneer panel assembly 200 may be achieved by using a face layer 300, a backing layer 302, and an adhesive 304 each having relatively small thicknesses. For example, a thickness 306 of the face layer 300 (e.g., the carbon fiber material) may be between 0.005 inches (0.127 mm) and 0.05 inches (1.27 mm), between 0.01 inches (0.254 mm) and 0.05 inches (1.27 mm), between 0.02 inches (0.508 mm) and 0.03 inches (0.762 mm), or about 0.02 inches (0.508 mm). By way of another example, a thickness 308 of the backing layer 302 may be between 0.001 inches (0.0254 mm) and 0.1 inches (2.54 mm). For instance, the thickness of the backing layer 302 may be 0.01 inches (0.254 mm), or 10 mil. By way of another example, a thickness 310 of the adhesive 304 may be between 0.001 inches (0.0254 mm) and 0.01 inches (0.254 mm), between 0.002 inches (0.0508 mm) and 0.01 inches (0.254 mm), between 0.002 inches (0.0508 mm) and 0.005 inches (0.127 mm), or about 0.002 inches (0.0508 mm). Where used in this context, about refers to the referenced value plus or minus 10 percent of the referenced value.

As such, the veneer panel assembly 200 may be formed to have a desired thickness 214, and the addition of the face layer 300 and the adhesive 304 may minimally affect the thickness 214 of the veneer panel assembly 200. For example, the thickness 308 of the backing layer 302 may be multiple times the combined thicknesses 306, 310 of the face layer 300 and the adhesive 304, respectively. It is noted herein the handles, knobs, or other features or hardware designed for a veneer panel having a predetermined thickness may be couplable to the veneer panel assembly 200. Due to the minimal affecting of the thickness 214 of the veneer panel assembly 200 by the addition of the face layer 300 and the adhesive 304, the existing handles, knobs, or other features or hardware may be coupled to the veneer panel assembly 200 without engineering changes made to the handles, knobs, or other features or hardware. In this regard, the veneer panel assembly 200 may advantageously be used in many existing aerospace environments (e.g., existing cabinet systems, or the like) and/or may be used as a replacement veneer panel in existing aerospace environments.

The thickness 306 of the carbon fiber material of the face layer 300 may be reduced via a sanding process to increase the flexibility of the face layer 300 (and thus the flexibility of the veneer panel assembly 200). For example, the range of values for the thickness 306 listed above may be achieved during fabrication of the face layer 300 or with the sanding process being applied post-fabrication. It is noted herein, however, that sanding the carbon fiber material of the face layer 300 may increase the size of natural voids or interstitial spaces in the carbon fiber material, which may allow light and/or adhesive to pass through the surface of the face layer 300. For example, where the decorative veneer is fabricated from a carbon fiber material, sanding the carbon fiber material may allow for natural voids or interstitial spaces in the carbon fiber weave to increase in size (or at least become apparent). For instance, the natural voids or interstitial spaces may let adhesive used to bond the carbon fiber material to the aircraft cabin interior structures or components to soak through the carbon fiber material. For example, where the adhesive is a noticeable color (e.g., orange, or the like), the color may be visible through the carbon fiber material, reducing the aesthetic appeal of the decorative veneer.

As such, the backing layer 302 may be selected to assist the carbon fiber material of the face layer 300 in remaining flexible. In addition, the backing layer 302 may be selected to prevent the view of light and/or adhesive to pass through the surface of the face layer 300. Due to the above properties of the face layer 300 and the adhesive 304, the face layer 300 and the adhesive 304 may be applied to any backing layer 302.

In one non-limiting example, the backing layer 302 may be a single-ply flexible fleece, such that the veneer panel assembly 200 is two-ply (e.g., the face layer 300 and the backing layer 302). The flexible fleece may be thin and fibrous. For example, the flexible fleece may include a woven cellulose material. For instance, the woven cellulose material may be selected so as to not adversely affect the veneer panel assembly 200 (and thus the decorative veneer 104) satisfying or exceeding the requirements set forth in the FAR 25.853 burn requirements tests, as defined above.

The bonding of the flexible fleece to the carbon fiber material may involve a pressing or bonding process that activates the adhesive (or chemical within the adhesive) and causes the adhesive to bond the flexible fleece to the carbon fiber material. For example, pressurized steam or hot air may be applied to the carbon fiber material and the flexible fleece, causing the adhesive 304 to bond the carbon fiber material and the flexible fleece. It is noted herein bonding the carbon fiber material to the flexible fleece via the adhesive 304 may seal the voids or interstitial spaces found in the carbon fiber material (e.g., both pre-sanding voids or interstitial spaces and post-sanding voids or interstitial spaces), so the adhesive 210 used to bond the veneer panel assembly 200 to the aviation honeycomb layer 204 does not soak through the face layer 300.

The combination of the flexible fleece and the sanded carbon fiber layer may allow for the veneer panel assembly 200 to be able to conform to curved surfaces of the one or more aircraft cabin interior structures or components 102. In this regard, the backing layer 302 being fabricated from the flexible fleece may allow the entire veneer panel assembly 200 to be very flexible and conform to a radius 312 on the one or more aircraft cabin interior structures or components 102. For example, the radius 312 may be a radius of at least 0.50 inches (12.7 millimeters (mm)). By way of another example, the radius 312 may be a radius between 0.25 inches (6.35 mm) and 0.50 inches. By way of another example, the radius 312 may be a radius of at least 0.25 inches.

Although embodiments of the present disclosure illustrate the backing layer 302 being a flexible fleece layer, it is noted herein the backing layer 302 may include any backing material capable of providing the carbon fiber material of the face layer 300 with a select amount of flexibility while also preventing the view of light and/or adhesive to pass through the surface of the face layer 300. For example, the backing layer 302 may include a flexible layer fabricated from one or more plies of wood, aluminum, or the like. For instance, the backing layer 302 may include two flexible plies of wood coupled together and positioned with the respective grains oriented at 90 degrees relative to each other.

It is noted herein the face layer 300 and/or the backing layer 302 may be treated with any number of additional processes (e.g., the addition of a surface layer of a vinyl material to facilitate bonding, or the like). However, it is noted herein the properties of the adhesive 304 may facilitate bonding the adhesive 304 to the carbon fiber of the face layer 300 and/or to the material of the backing layer 302 without treatment of the face layer 300 and/or the backing layer 302.

The backing layer 302 may be oriented adjacent to the first surface 206 of the aviation honeycomb layer 204 such that the face layer 300 faces away from the aviation honeycomb layer 204. In this regard, the veneer panel assembly 200 may be oriented in such a manner that the face layer 300 is exposed to be viewed by people in the environment of the veneer panel assembly 200, and the panel 202 may be hidden from view.

It is noted herein the backing layer 302 and/or the aviation honeycomb layer 204 may be treated with any number of additional processes (e.g., the addition of a surface layer of a vinyl material to facilitate bonding, or the like). However, it is noted herein the properties of the adhesive 210 may facilitate bonding the adhesive 210 to the material of the backing layer 302 and/or the material of the aviation honeycomb layer 204 without treatment of the backing layer 302 and/or the aviation honeycomb layer 204.

Referring again to FIGS. 2A and 2B, the aviation honeycomb layer 204 and the panel 202 may form a base structure of the one or more aircraft interior structures or components 102, upon which the veneer panel assembly 204 may be installed.

The panel 202 may include wood, aluminum, or the like, and may be treated with a fire retardant. For example, the panel 202 may be formed and then submerged in a bath of a fire retardant such as a water-based fire retardant which allows the fire retardant to flow into the material of the panel 202. The panel 202 may include one, two, or more plies of a wood material such as poplar, oak, or the like. For example, two or more plies may be oriented such that the grain of adjacent plies lies at an angle that is approximately 90 degrees relative to each other. It is noted herein the panel 202 may be constructed similar to a veneer panel assembly 200, such that the face layer 300 is visible (e.g., where the one or more aircraft cabin interior structures or components 102 is a cabinet door and the panel 202 is visible when the cabinet door is open). In addition, it is noted herein the decorative veneer 104 may not include a panel 202.

The aviation honeycomb layer 204 may include any aviation honeycomb material. For example, the aviation honeycomb layer 204 may include one or more of aluminum, fiberglass, an epoxy-based resin, a phenolic-based resin, a composite material, or the like. For example, the aviation honeycomb layer 204 may include columnar, hexagonal, or similar-shaped hollow cells oriented between relatively thin vertical walls.

It is noted herein the aviation honeycomb layer 204 and/or the panel 202 may be treated with any number of additional processes (e.g., the addition of a surface layer of a vinyl material to facilitate bonding, or the like). However, it is noted herein the properties of the adhesive 212 may facilitate bonding the adhesive 212 to the material of the aviation honeycomb layer 204 and/or the material of the panel 202 without treatment of the aviation honeycomb layer 204 and/or the panel 202.

Figure 4A:
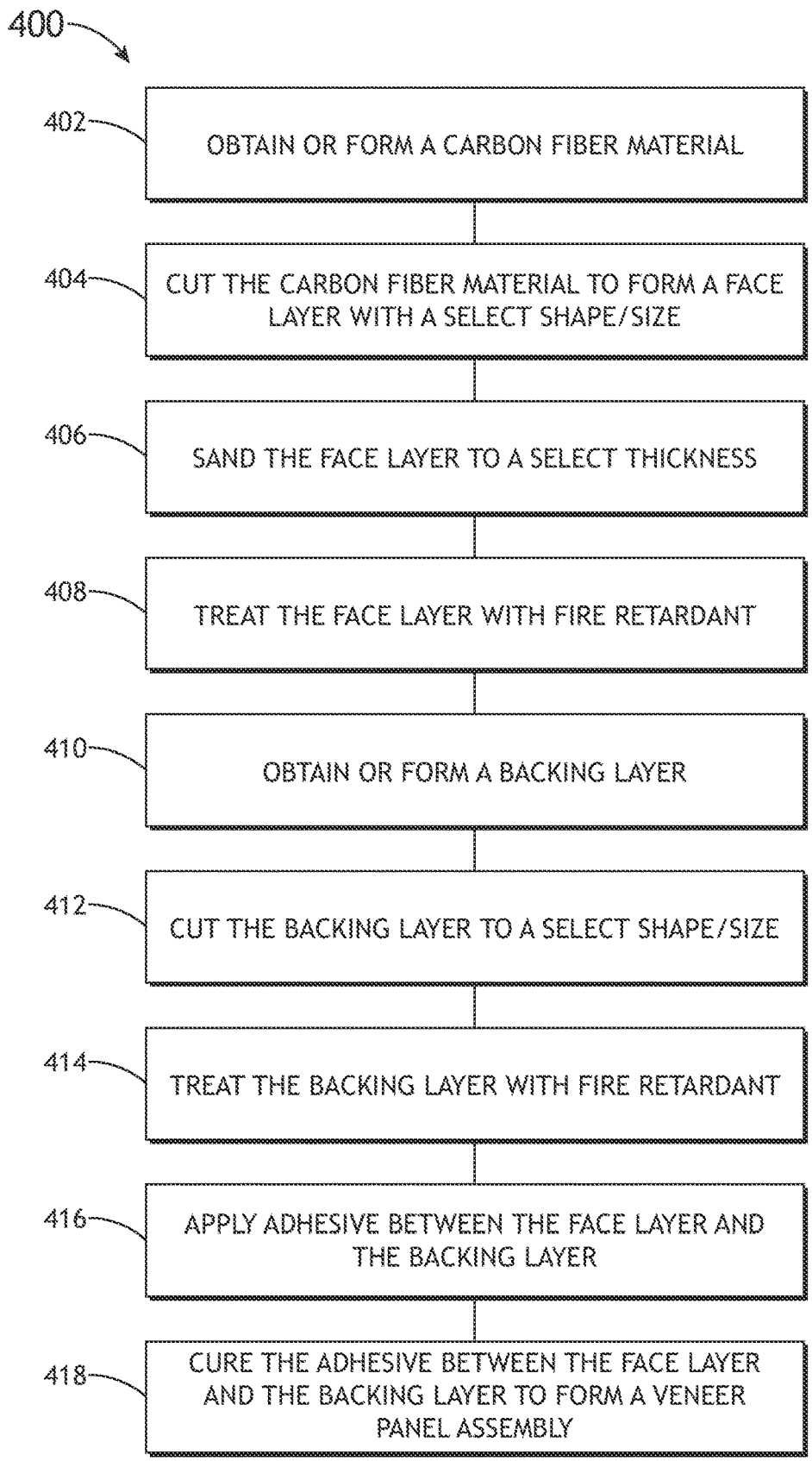
FIG. 4A illustrates a method or process for forming a veneer panel assembly of a flexible carbon fiber decorative veneer, in accordance with one or more embodiments of the present disclosure.
Figure 4B:
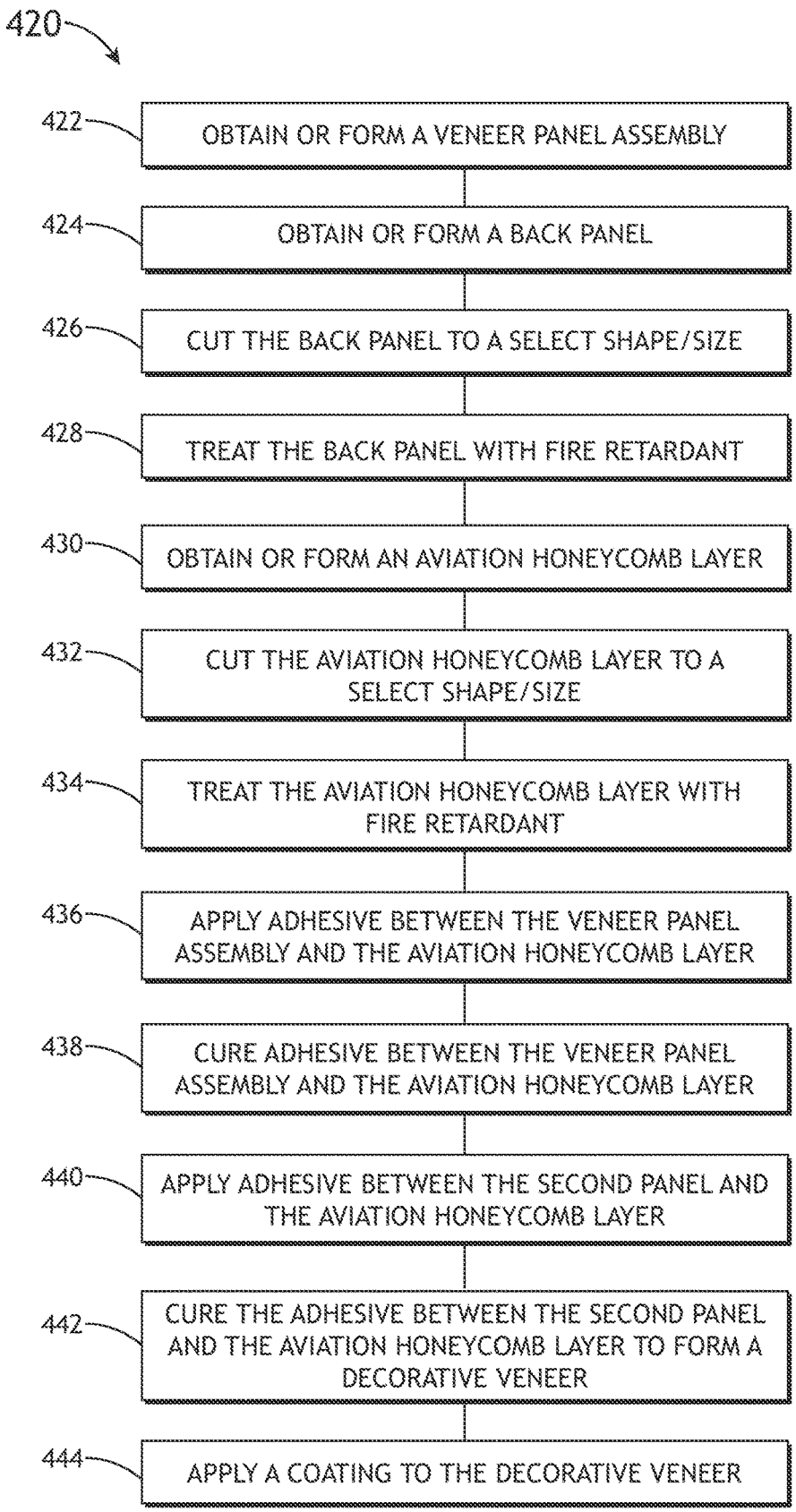
FIG. 4B illustrates a method or process for forming a flexible carbon fiber decorative veneer, in accordance with one or more embodiments of the present disclosure.

FIGS. 4A and 4B in general illustrate methods or processes for fabricating a flexible carbon fiber decorative veneer, in accordance with one or more embodiments of the present disclosure.

FIG. 4A illustrates a method or process 400 for fabricating a veneer panel assembly 200, in accordance with one or more embodiments of the present disclosure.

In a step 402, a carbon fiber material is obtained or formed. The carbon fiber material may be purchased or fabricated as a roll or sheet of material. The carbon fiber material may include woven carbon fibers bonded together by an epoxy.

In a step 404, the carbon fiber material is cut to form a face layer with a select shape/size. The face layer 300 may be cut from the obtained or formed roll or sheet of material. It is noted herein, however, the carbon fiber material may be obtained or formed in the select shape/size such that cutting is not required.

In a step 406, the face layer is sanded to a select thickness. The carbon fiber material may be sanded to make the face layer 300 more flexible. The sanding of the carbon fiber material, however, may increase the size of natural voids or interstitial spaces in the carbon fiber material, which may allow light and/or adhesive to pass through the surface of the face layer 300. It is noted herein, however, the face layer 300 may be formed at a thickness such that sanding is not necessary.

In a step 408, the carbon fiber material is treated with fire retardant. For example, a water-based or non-water-based fire retardant may be applied to the face layer 300 in order to treat the face layer 300, causing the face layer 300 to be relatively fire resistant.

It is noted herein that steps 404, 406, 408 may be performed in any order. In addition, it is noted herein that step 408 may be optional. For example, the face layer 300 may not be treated with fire retardant in step 408 due to the carbon fiber material being pre-treated, the face layer 300 not needing to be treated in general, or the like. Therefore, the description should not be interpreted as a limitation on the scope of the disclosure but merely an illustration.

In a step 410, a backing layer is obtained or formed. The backing layer 302 may be a flexible fleece material. It is noted herein, however, the backing layer 302 may be a flexible layer fabricated from one or more plies of wood, aluminum, or the like, where the flexible layer is capable of providing the carbon fiber material of the face layer 300 with a select amount of flexibility while also preventing the view of light and/or adhesive to pass through the surface of the face layer 300.

In a step 412, the backing layer is cut to a select shape/size. The backing layer 302 may be cut to conform to the face layer 300. It is noted herein, however, the backing layer 302 may be obtained or formed in the select shape/size, such that cutting is not required.

In a step 414, the backing layer is treated with fire retardant. For example, a water-based or non-water-based fire retardant may be applied to the backing layer 302 in order to treat the backing layer 302, causing the backing layer 302 to be relatively fire resistant.

In a step 416, adhesive may be applied between the face layer and the backing layer. For example, adhesive 304 may be provided in liquid form, or in a sheet form which may be cut to a desired shape to match that of the face layer and the backing layer. By way of another example, where the adhesive 304 is in sheet form, the adhesive 304 may be provided with thin films on either surface that reduce the likelihood of premature curing of the adhesive 304. For instance, the thin films may be removed prior to stacking the adhesive 304 between the face layer 300 and the backing layer 302. It is noted herein the backing layer 302 may be obtained with a pre-applied adhesive, such that the adhesive 304 may not be applied between the face layer 300 and the backing layer 302.

It is noted herein the adhesive 304 may need select chemical and/or physical properties to prevent the adhesive 304 from passing through the voids or interstitial spaces in the carbon fiber material of the face layer 300. For example, the adhesive 304 may need to be of a select viscosity, and/or may need to bond to the remaining carbon fiber material more quickly than the adhesive can pass through the voids or interstitial spaces. In addition, it is noted herein the flexible fleece of the backing layer 304 may need to be able to hold enough of the adhesive 304 to prevent the adhesive 304 from passing through the voids or interstitial spaces in the carbon fiber material of the face layer 300, while still allowing for enough adhesive 304 remaining to bond the face layer 300 to the backing layer 302.

It is noted herein that steps 412, 414, 416 may be performed in any order. In addition, it is noted herein that step 414 may be optional. For example, the backing layer 302 may not be treated with fire retardant in step 414 due to the flexible fleece being pre-treated, the backing layer 302 not needing to be treated in general, or the like. Therefore, the description should not be interpreted as a limitation on the scope of the disclosure but merely an illustration.

In a step 418, the adhesive between the face layer and the backing layer may be cured to form a veneer panel assembly. Once the adhesive 304 is in place between the face layer 300 and the backing layer 302, the adhesive 304 may be cured. For example, the adhesive 304 may be a thermoset material and may be cured by any one or more of applying pressure to the veneer panel assembly 200, increasing a temperature of the adhesive 304, or the like. Where the adhesive 304 is a thermoset adhesive, the bonding to the face layer 300 and the backing layer 302 may be relatively sturdy because the adhesive 304 may not be configured to reactivate after setting, even if activation conditions are re-applied. The bonding of the flexible fleece to the carbon fiber material may involve a pressing or bonding process that activates the adhesive (or chemical within the adhesive) and causes the adhesive to bond the flexible fleece to the carbon fiber material. For example, pressurized steam or hot air may be applied to the carbon fiber material and the flexible fleece, causing the adhesive 304 to bond the carbon fiber material and the flexible fleece. It is noted herein bonding the carbon fiber material to the flexible fleece via the adhesive 304 may seal the voids or interstitial spaces found in the carbon fiber material (e.g., both pre-sanding voids or interstitial spaces and post-sanding voids or interstitial spaces), so the adhesive 210 used to bond the veneer panel assembly 200 to the aviation honeycomb layer 204 does not soak through the face layer 300.

After curing of the adhesive, the combination of the face layer 300, the backing layer 302, and the adhesive 304 may be regarded as a veneer panel assembly 200 (e.g., a two-ply veneer panel assembly, taking into account the single-ply face layer 300 and the single-ply backing layer 302).

FIG. 4B illustrates a method or process 420 for fabricating a decorative veneer 104, in accordance with one or more embodiments of the present disclosure.

In a step 422, a veneer panel assembly may be obtained or formed. The veneer panel assembly 200 may be formed via one or more steps of the method or process 400 as described above.

In a step 424, a back panel may be obtained or formed. The back panel 202 may include wood, aluminum, or other materials. For example, the back panel 202 may include different features than the veneer panel assembly 200. For instance, the back panel 202 may include two or more plies of wood coupled together via an adhesive or a fastener, one or more plies of aluminum, or the like (e.g., without a carbon fiber material for a face layer). By way of another example, the back panel 202 may include similar or identical features as the veneer panel assembly 200 (e.g., with a carbon fiber material face layer 300), and may be formed in a similar manner as the veneer panel assembly 200.

In a step 426, the back panel may be cut to a select shape/size. The back panel 202 may be cut to conform to the veneer panel assembly 200. It is noted herein, however, the back panel 202 may be obtained or formed in the select shape/size, such that cutting is not required.

In a step 428, the back panel may be treated with fire retardant. For example, a water-based or non-water-based fire retardant may be applied to the back panel 202 in order to treat the back panel 202, causing the back panel 202 to be relatively fire resistant.

In a step 430, an aviation honeycomb layer may be obtained or formed. For example, the aviation honeycomb layer 204 may include one or more of aluminum, fiberglass, an epoxy-based resin, a phenolic-based resin, a composite material, or the like. For example, the aviation honeycomb layer 204 may include columnar, hexagonal, or similar-shaped hollow cells oriented between relatively thin vertical walls.

In a step 432, the aviation honeycomb layer may be cut to a select shape/size. The aviation honeycomb layer 204 may be cut to conform to the veneer panel assembly 200. It is noted herein, however, the aviation honeycomb layer 204 may be obtained or formed in the select shape/size, such that cutting is not required.

In a step 434, the aviation honeycomb layer may be treated with fire retardant. For example, a water-based or non-water-based fire retardant may be applied to the aviation honeycomb layer 204 in order to treat the aviation honeycomb layer 204, causing the aviation honeycomb layer 204 to be relatively fire resistant.

It is noted herein that steps 422, 424, 430 may be performed in any order (with corresponding respective sub-steps 426, 428, 432, 434). In addition, it is noted herein that one or more of steps 428 and 434 may be optional. For example, the back panel 202 may not be treated with fire retardant in step 428 due to the back panel 202 being pre-treated during fabrication, the back panel 202 not needing to be treated in general, or the like. By way of another example, the aviation honeycomb layer 204 may not be treated with fire retardant in step 434 due to the aviation honeycomb layer 204 being pre-treated during fabrication, the aviation honeycomb layer 204 not needing to be treated in general, or the like. Therefore, the description should not be interpreted as a limitation on the scope of the disclosure but merely an illustration. Therefore, the description should not be interpreted as a limitation on the scope of the disclosure but merely an illustration.

In a step 436, an adhesive may be applied between the veneer panel assembly and the aviation honeycomb layer. For example, adhesive 210 may include, but is not limited to, a liquid contact adhesive.

In a step 438, the adhesive between the veneer panel assembly and the aviation honeycomb layer may be cured. Once the adhesive 210 is in place between the veneer panel assembly 200 and the aviation honeycomb layer 204, the adhesive 210 may be cured. For example, the adhesive 210 may be cured by applying pressure to the veneer panel assembly 200 and the aviation honeycomb layer 204 for a select cure time. It is noted herein the bonding to the veneer panel assembly 200 and the aviation honeycomb layer 204 may be relatively permanent where the adhesive 210 is not be configured to reactivate after setting, even if activation conditions are re-applied.

It is noted herein the backing layer 302 may prevent the adhesive 210 used to bond the veneer panel assembly 200 to the aviation honeycomb layer 204 to not soak through the face layer 300.

In a step 440, adhesive may be applied between the back panel and the aviation honeycomb layer. For example, adhesive 212 may include, but is not limited to, a liquid contact adhesive.

In a step 442, the adhesive between the back panel and the aviation honeycomb layer may be cured to form a decorative veneer. Once the adhesive 212 is in place between the back panel 202 and the aviation honeycomb layer 204, the adhesive 212 may be cured. For example, the adhesive 212 may be cured by applying pressure to the back panel 202 and the aviation honeycomb layer 204 for a select cure time. It is noted herein the bonding to the back panel 202 and the aviation honeycomb layer 204 may be relatively permanent where the adhesive 212 is not be configured to reactivate after setting, even if activation conditions are re-applied.

It is noted herein that some combination of the veneer panel assembly 200, the panel 202, the aviation honeycomb layer 204, the adhesive 210, and the adhesive 212 may be regarded as a decorative veneer 104.

In a step 444, a coating may be applied to the decorative veneer. An additional coating selected by a customer to provide increased protection (e.g., from fire, impact, or the like) and/or to match with other veneer on other aircraft cabin interior structures or components 102 in the aircraft 100 may be applied to the decorative veneer 104. For example, the additional coating may include a material designed to resist the spread of fire and assist the veneer panel assembly 200 (and thus the decorative veneer 104) in satisfying or exceeding the requirements set forth in the FAR 25.853 burn requirements tests, as defined above. It is noted herein the carbon fiber material of the face layer 300 may be scuffed or lightly abrased to allow for the addition of an additional coating. It is noted herein the scuffing or light abrasing of the carbon fiber material of the face layer 300 should not adversely affect the veneer panel assembly 200 (and thus the decorative veneer 104) satisfying or exceeding the requirements set forth in the FAR 25.853 burn requirements tests, as defined above.

It is noted herein that steps 436 and 440 may be performed in any order (with corresponding 438 and 442 respectively). In addition, it is noted herein that one or more of steps 436 or 440 (with corresponding sub steps 438 and 442 respectively), or step 444 may be optional. For example, the veneer panel assembly 200 and the aviation honeycomb layer 204 may be coupled with one or more fasteners. By way of another example, the panel 202 and the aviation honeycomb layer 204 may be coupled with one or more fasteners. Therefore, the description should not be interpreted as a limitation on the scope of the disclosure but merely an illustration.

It is noted herein the methods or processes 400 and 420 are not limited to the steps and/or sub-steps provided. The methods or processes 400 and 420 may include more or fewer steps and/or sub-steps. The methods or processes 400 and 420 may perform the steps and/or sub-steps simultaneously. The methods or processes 400 and 420 may perform the steps and/or sub-steps sequentially, including in the order provided or an order other than provided. Therefore, the above description should not be interpreted as a limitation on the scope of the present disclosure but merely an illustration.

As such, advantages of the present disclosure include a flexible carbon fiber decorative veneer 104 with a desired level of aesthetic quality, flexibility, and fire retardancy to be used on sections of one or more aircraft cabin interior structures or components 102 having various radii 312, instead of or in addition to rigid carbon fiber decorative veneer. Embodiments of the present disclosure are also directed to methods of fabricating a flexible carbon fiber decorative veneer 104 with the desired level of aesthetic quality, flexibility, and fire retardancy.

Although embodiments of the disclosure are directed to using the decorative veneer 104 in an aircraft, it is noted herein the decorative veneer 104 is not limited to aircraft. For example, the decorative veneer 104 may be used in any vehicle. For instance, the vehicle may be any air, space, land, or water-based personal equipment or vehicle; any air, space, land, or water-based commercial or industrial equipment or vehicle; any air, space, land, or water-based military equipment or vehicle; or the like. By way of another example, the decorative veneer 104 may be used in as part of a structure or a component configured to be installed within, housed within, or attached to a structure. For instance, the structure may include, but is not limited to, a residential establishment (e.g., a house, an apartment, or the like), a commercial or industrial establishment (e.g., an office building, a storage building, or the like), a military establishment, or the like. Therefore, the description should not be interpreted as a limitation on the scope of the disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A flexible carbon fiber decorative veneer, comprising:
a veneer panel assembly, comprising:
   a face layer formed from a carbon fiber material;
   a backing layer formed from a flexible fleece; and
   an adhesive positioned between the face layer and the backing layer, the adhesive being configured to attach the face layer to the backing layer through an activation via at least one joining process,
   the backing layer being configured to prevent light from passing through voids or interstitial spaces in the carbon fiber material of the face layer when the backing layer is attached to the face layer via the adhesive,
the flexible carbon fiber decorative veneer being configured for use on an aircraft interior structure, the veneer panel assembly being configured to conform to a radius of at least 0.25 inches on the aircraft interior structure; and
an aviation honeycomb layer of the flexible carbon fiber decorative veneer, the veneer panel assembly being configured to be coupled to the aviation honeycomb layer; and
a back panel of the flexible carbon fiber decorative veneer, the aviation honeycomb layer being configured to be coupled to the back panel,
the aviation honeycomb layer and the back panel forming a base structure of the aircraft interior structure, the aviation honeycomb layer and the back panel being fabricated with the radius of at least 0.25 inches.

2. The flexible carbon fiber decorative veneer of claim 1, the carbon fiber material forming the face layer being sanded from a first thickness to a second, lesser thickness prior to the face layer being attached to the backing layer via the adhesive.

3. The flexible carbon fiber decorative veneer of claim 1, the flexible fleece being a woven cellulose material.

4. The flexible carbon fiber decorative veneer of claim 3, the adhesive being pre-applied to the woven cellulose material of the flexible fleece of the backing layer.

5. The flexible carbon fiber decorative veneer of claim 1, the adhesive being a thermoset dry film adhesive, the at least one joining process including at least one bonding process utilizing one or more of a select pressure or a select temperature.

6. A method comprising:
forming a face layer of a veneer panel assembly of a flexible carbon fiber decorative veneer from a carbon fiber material;
forming a backing layer of the veneer panel assembly of the flexible carbon fiber decorative veneer from a flexible fleece; and
forming the veneer panel assembly of the flexible carbon fiber decorative veneer by attaching the face layer to the backing layer via at least one joining process with an adhesive positioned between the face layer and the backing layer,
the backing layer being configured to prevent light from passing through voids or interstitial spaces in the carbon fiber material of the face layer when the backing layer is attached to the face layer via the adhesive,
the flexible carbon fiber decorative veneer being configured for use on an aircraft interior structure, the veneer panel assembly being configured to conform to a radius of at least 0.25 inches on the aircraft interior structure; and
coupling the veneer panel assembly to an aviation honeycomb layer of the flexible carbon fiber decorative veneer; and
coupling the aviation honeycomb layer to a back panel of the flexible carbon fiber decorative veneer,
the aviation honeycomb layer and the back panel forming a base structure of the aircraft interior structure, the aviation honeycomb layer and the back panel being fabricated with the radius of at least 0.25 inches.

7. The method of claim 6, further comprising:
sanding the carbon fiber material of the face layer from a first thickness to a second, lesser thickness prior to the face layer being attached to the backing layer via the adhesive.

8. The method of claim 6, the flexible fleece being a woven cellulose material.

9. The method of claim 8, the adhesive being pre-applied to the woven cellulose material of the flexible fleece of the backing layer.

10. The method of claim 6, the adhesive being a thermoset dry film adhesive, the at least one joining process including at least one bonding process utilizing one or more of a select pressure or a select temperature.

11. The method of claim 6, further comprising at least one of:
coupling the veneer panel assembly to the aviation honeycomb layer by attaching the veneer panel assembly to the aviation honeycomb layer via the at least one joining process with an adhesive positioned between the veneer panel assembly to the aviation honeycomb layer; or
coupling the aviation honeycomb layer to the back panel by attaching the aviation honeycomb layer to the back panel via the at least one joining process with an adhesive positioned between the aviation honeycomb layer to the back panel.

* * * * *